United States Patent
Ogata et al.

(10) Patent No.: US 7,895,969 B2
(45) Date of Patent: Mar. 1, 2011

(54) METHOD AND APPARATUS FOR FORMING OUTER ELECTRODE OF ELECTRONIC COMPONENT

(75) Inventors: Katsunori Ogata, Sabae (JP); Kenichi Aoki, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 3 days.

(21) Appl. No.: 11/946,526

(22) Filed: Nov. 28, 2007

(65) Prior Publication Data
US 2008/0131589 A1    Jun. 5, 2008

Related U.S. Application Data

(63) Continuation of application No. PCT/JP2006/308600, filed on Apr. 25, 2006.

(30) Foreign Application Priority Data

Jul. 8, 2005    (JP) ............................. 2005-199932

(51) Int. Cl.
*B05C 11/00* (2006.01)
*B05C 3/00* (2006.01)
*B05C 3/02* (2006.01)

(52) U.S. Cl. ..................... 118/696; 118/423; 118/677

(58) Field of Classification Search ............... 118/423, 118/665–698, 500, 503; 427/96.1
See application file for complete search history.

(56) References Cited

U.S. PATENT DOCUMENTS 3,122,781 A * 3/1964 Mutter ..................... 118/413
3,756,196 A * 9/1973 Furuuchi et al. ............ 118/401
5,249,906 A   10/1993 Nakagawa et al.
5,275,661 A * 1/1994 Nakagawa et al. .......... 118/425

(Continued)

FOREIGN PATENT DOCUMENTS

JP    5-243109 A    9/1993

(Continued)

OTHER PUBLICATIONS

English translated doc of JP 2002-237403, Aug. 23, 2002.*

(Continued)

*Primary Examiner*—Yewebdar T Tadesse
(74) *Attorney, Agent, or Firm*—Keating & Bennett, LLP

(57) ABSTRACT

A method for forming an outer electrode capable of reducing a tact time when electrode paste is applied to end surfaces of electronic components a plurality of times. A paste tank 4 having a squeegee blade that is vertically slidable is disposed on a flat board 1 having an area being a plurality of times as large as that of a holding plate in a longitudinal direction of the flat board. A paste film is spread on the flat board by moving the flat board 1 by a length corresponding to the length of one holding plate while a predetermined gap is maintained between the squeegee blade and the flat board. The electrode paste is applied to first end surfaces of electronic components C held by the holding plate H by dipping the first end surfaces of the electronic components C in this paste film. The electrode paste is applied to the first end surfaces of the electronic components a plurality of times by repeating the spreading step and the applying step.

10 Claims, 4 Drawing Sheets

U.S. PATENT DOCUMENTS 5,753,299 A * 5/1998 Garcia et al. .................. 427/76
6,139,639 A * 10/2000 Kitamura et al. ............ 118/680

FOREIGN PATENT DOCUMENTS

JP  07-161592  *  6/1995
JP  7-161592 A  6/1995

OTHER PUBLICATIONS

Official Communication issued in corresponding Chinese Patent Application No. 200680024314.9, mailed on Aug. 30, 2010.

* cited by examiner (a)

(b)

METHOD AND APPARATUS FOR FORMING OUTER ELECTRODE OF ELECTRONIC COMPONENT

CROSS-REFERENCE TO RELATED APPLICATIONS

This is a continuation under 35 U.S.C. §111(a) of PCT/JP2006/308600 filed Apr. 25, 2006, and claims priority of JP2005-199932 filed Jul. 8, 2005, incorporated by reference.

BACKGROUND

1. Technical Field

The present disclosure relates to methods for forming an outer electrode of each of chip-type electronic components, and in particular, relates to methods for forming an outer electrode of each of electronic components in which electrode paste is applied to first end surfaces of a large number of electronic components that are held by a holding plate such that the first end surfaces of the electronic components protrude outward.

2. Background Art

In a well-known method for forming outer electrodes on both end surfaces of chip-type electronic components, a large number of electronic components are held by a holding plate such that first end surfaces of the electronic components protrude outward, and electrode paste is applied to the first end surfaces of the electronic components. After the electrode paste is dried, the holding position by the holding plate is changed such that the protruding end surfaces of the electronic components are reversed, and the electrode paste is similarly applied to second end surfaces of the electronic components. After the electrode paste is dried, the electronic components having the outer electrodes formed on both end surfaces are taken out of the holding plate.

Patent Document 1 proposes an electrode-applying apparatus including a collecting blade for scraping electrode paste on the bottom surface of a dip tank together to one side of the dip tank and a squeegee blade for adjusting the thickness of a paste film while leveling the electrode paste scraped together to the one side of the dip tank toward the other side. The collecting blade and the squeegee blade can be horizontally reciprocated in an integrated manner with respect to the dip tank.

Patent Document 2 proposes an apparatus for applying outer electrodes using a flat board and a box-shaped paste tank. The paste tank includes a side wall having a squeegee blade vertically slidable so as to adjust a gap from the flat board and the other side wall whose lower end portion is in close contact with the flat board. Furthermore, the paste tank stores electrode paste inside thereof. A paste film having a predetermined thickness can be spread on the flat board by sliding the paste tank along the flat board while a predetermined gap is maintained between the squeegee blade and the flat board. First end surfaces of electronic components held by a holding plate are dipped in the paste film spread on the flat board such that the electrode paste adheres to the first end surfaces of the electronic components. The electrode paste remaining on the flat board can be removed, i.e., collected, from the flat board by sliding the paste tank in a direction opposite to the direction of spreading the paste while the squeegee blade is in contact with the flat board.

When the electrode paste is applied to the end surfaces of the electronic components only one time, the film thickness values at corners of the electronic components tend to be small. Thus, the electrode paste is sometimes applied a plurality of times. According to the technologies described in Patent Documents 1 and 2, every time the paste film is spread and applied, the remaining paste needs to be collected (removed). Therefore, when the electrode paste is applied a plurality of times (herein, two times) as shown in FIG. 1, a tact time T is increased, and working efficiency is impaired.

The dip tank or the flat board can be extended to a length corresponding to that of a plurality of holding plates in the longitudinal direction such that the electrode paste being spread on this extended flat board is applied to the electronic components a plurality of times. In this method, the collection of the remaining paste is performed only one time after the electrode paste is applied a plurality of times, and thus the tact time can be reduced. However, in this method, there is a time difference between the first electrode application and the last electrode application after spreading the electrode paste, and the properties (such as viscosity) of the electrode paste are changed, during this period, due to volatilization of a solvent from the electrode paste spread as a thin film. In particular, when the electrode paste is spread so as to form a thin film, the surface area of the electrode paste is increased, and the volatilization of the solvent is accelerated. With this, application failures such as pinholes may occur in the paste applied to the electronic components.

Patent Document 1: Japanese Unexamined Patent Application Publication No. 5-243109

Patent Document 2: Japanese Unexamined Patent Application Publication No. 7-161592

SUMMARY

Disclosed herein are embodiments which provide a method and an apparatus for forming an outer electrode of each of electronic components and capable of reducing a tact time when electrode paste is applied on end surfaces of the electronic components a plurality of times and capable of preventing application failures of the outer electrodes.

The above can be achieved by the method for forming an outer electrode of each of electronic components and the apparatus for forming an outer electrode of each of electronic components disclosed herein.

According to an embodiment, a method for forming an outer electrode of each of electronic components in which electrode paste is applied to first end surfaces of a large number of electronic components that are held by a holding plate such that the first end surfaces of the electronic components protrude outward includes a preparing step of preparing a flat board having an area being a plurality of times as large as that of the holding plate in a longitudinal direction of the flat board and a squeegee blade vertically slidable so as to adjust a gap from the flat board; a spreading step of spreading a paste film having a predetermined thickness on the flat board by moving relatively the squeegee blade with respect to the flat board in the longitudinal direction of the flat board by a length corresponding to the length of substantially one holding plate while a predetermined gap is maintained between the squeegee blade and the flat board; and an applying step of applying the electrode paste to the first end surfaces of the electronic components held by the holding plate by dipping the first end surfaces of the electronic components in the paste film having a size substantially equal to that of one holding plate spread on the flat board. The electrode paste is applied to the first end surfaces of the electronic components a plurality of times by repeating the spreading step and the applying step.

According to another embodiment, an apparatus for forming an outer electrode of electronic components in which electrode paste is applied to first end surfaces of a large number of electronic components held by a holding plate such that the first end surfaces protrude outward includes a flat board having an area being a plurality of times as large as that of the holding plate in a longitudinal direction of the flat board; a squeegee blade vertically slidable so as to adjust a gap from the flat board; spreading means for spreading a paste film having a predetermined thickness on the flat board by moving relatively the squeegee blade with respect to the flat board in the longitudinal direction of the flat board by a length corresponding to the length of substantially one holding plate while a predetermined gap is maintained between the squeegee blade and the flat board; applying means for applying the electrode paste to the first end surfaces of the electronic components held by the holding plate by dipping the first end surfaces of the electronic components in the paste film having a size substantially equal to that of one holding plate spread on the flat board; and controlling means for controlling the spreading means and the applying means in spreading operations and dipping operations, in which every time the paste film having a size substantially equal to that of one holding plate is spread, the first end surfaces of the electronic components held by the holding plate are dipped in the paste film. The spreading operations and dipping operations are repeated until the electrode paste is applied to the first end surfaces of the electronic components a plurality of times.

According to the above-described embodiments, the flat board having an area being a plurality of times as large as that of the holding plate in the longitudinal direction of the flat board is prepared, and the squeegee blade vertically slidable so as to adjust the gap from the flat board is disposed above the flat board. The paste film is spread on the flat board by moving relatively the squeegee blade with respect to the flat board in the longitudinal direction of the flat board by a length corresponding to the length of substantially one holding plate while a predetermined gap is maintained between the squeegee blade and the flat board. The electrode paste is applied to the first end surfaces of the electronic components held by the holding plate by dipping the first end surfaces of the electronic components in the paste film having a size substantially equal to that of one holding plate. Herein, the size of substantially one holding plate does not necessarily correspond to the exact size of one holding plate, and may have some margins in the vicinity thereof.

Next, the operations of spreading the paste film on the flat board by moving relatively the squeegee blade with respect to the flat board in the longitudinal direction of the flat board by a length corresponding to the length of substantially one holding plate and of applying the electrode paste to the first end surfaces of the electronic components held by the holding plate by dipping the first end surfaces of the electronic components in the paste film are repeated again.

In a conventional method, every time an applying process is performed as shown in FIG. 1, a collecting (removing) process is required, and a series of processes of spreading, applying, and collecting is repeated. However, according to the present invention, the applying operation can be performed a plurality of times, i.e., spreading, applying, spreading, and applying as shown in FIG. 2, while the collecting process is not performed due to the flat board having a length corresponding to that of a plurality of holding plates, and the collecting process is performed only one time in the last step, resulting in a reduction in the tact time T by ΔT. It is obvious that the effect of reducing the tact time T is further increased as the number of applications is increased. Moreover, the time period from the spreading process to the applying process is short and substantially constant since every time the spreading process is performed, the applying process is performed, and the properties of the electrode paste are not changed during this period. With this, application failures of the outer electrodes can be prevented.

The squeegee blade may be moved relatively with respect to the flat board along the flat board by a predetermined length in the same direction as a direction of spreading the electrode paste while the squeegee blade is in contact with the flat board after the spreading step and by the next spreading step.

When the squeegee blade is moved relatively with respect to the flat board along the flat board in the same direction as the spreading direction by a predetermined length while the squeegee blade is in contact with the flat board as described above, an area having no paste film is formed between an anterior paste film and a posterior paste film.

When the electrode paste is spread on the flat board, the paste film needs to have a size larger than that of one holding plate so as to leave a space for preventing interference between the holding plate and the squeegee blade, and thus unnecessary areas are formed at both sides of the spread paste films. When the electrode is applied to the electronic components a plurality of times, these unnecessary paste films are added by the number of applications, and thus the consumption of the paste is disadvantageously increased. In contrast, when areas having no paste film are formed between the anterior paste film and the posterior paste film, the unnecessary paste films disposed at both sides of the paste films for preventing interference can be reduced, and the consumption of the paste can be reduced.

The paste film may be spread on the flat board by moving the flat board in the longitudinal direction of the flat board while the squeegee blade is retained at a certain position in the spreading step.

The squeegee blade may be horizontally moved while the flat board is retained at a certain position. However, the holding plate needs to be horizontally moved in accordance with the movement of the squeegee blade, and thus operating mechanisms become disadvantageously complicated. In contrast, when the flat board is horizontally moved, the squeegee blade is retained at a certain position, and the holding plate can only be raised and lowered at a certain position. Thus, the operating mechanisms can be simplified.

The method for forming an outer electrode of each of electronic components may further include a step of removing (collecting) the paste film spread on the flat board by moving the squeegee blade with respect to the flat board in a direction opposite to the spreading direction while the squeegee blade is in contact with the flat board after the electrode paste is applied to the first end surfaces of the electronic components a plurality of times.

In this case, the squeegee blade can function as both a blade for forming the paste film and a blade for collecting the remaining paste, and thus the structure can be simplified. Moreover, the tact time is not increased since the collecting step is performed only one time after the applying step is performed a plurality of times.

A paste tank that includes a side wall having the squeegee blade and the other side wall whose bottom end portion is in close contact with the flat board, and stores the electrode paste inside the paste tank may be used as spreading means for spreading the electrode paste, and the paste tank may be relatively movable with respect to the flat board in the longitudinal direction of the flat board. This corresponds to the box-shaped paste tank shown in Patent Document 2.

Moreover, a collecting blade located at a position remote from the squeegee blade by a distance in the longitudinal direction of the flat board and vertically slidable between a contact position where the collecting blade is in contact with the flat board and a remote position where the collecting blade is remote from the flat board may be provided. This corresponds to the collecting blade shown in Patent Document 1.

In this case, the paste film spread on the flat board can be removed by moving relatively the collecting blade with respect to the flat board in the direction opposite to the spreading direction while the squeegee blade is separated from the flat board and while the collecting blade is in contact with the flat board after the electrode paste is applied to the first end surfaces of the electronic components a plurality of times.

According to the above-described embodiments, when electrode paste is applied to the end surfaces of the electronic components a plurality of times, the flat board on which the paste film is spread is formed so as to have a length for spreading the paste film a plurality of times, and the electrode paste is successively applied to the end surfaces of the electronic components while the squeegee blade is moved relatively in one direction with respect to the flat board. Thus, no collecting step is required midstream, and the tact time can be reduced. Moreover, the time period from the spreading step to the applying step can be short and substantially constant since every time the paste film having a size substantially equal to that of one holding plate is spread, the electrode paste is applied to the end surfaces of the electronic components. Therefore, volatilization of the solvent of the electrode paste can be regulated, and thus irregular shapes of the applied electrodes can be avoided.

Other features and advantages of the disclosed apparatus and method will become apparent from the following detailed description of embodiments thereof which refers to the accompanying drawings.

DETAILED DESCRIPTION

Embodiments will now be described with reference to examples.

Example 1

Figure 3:
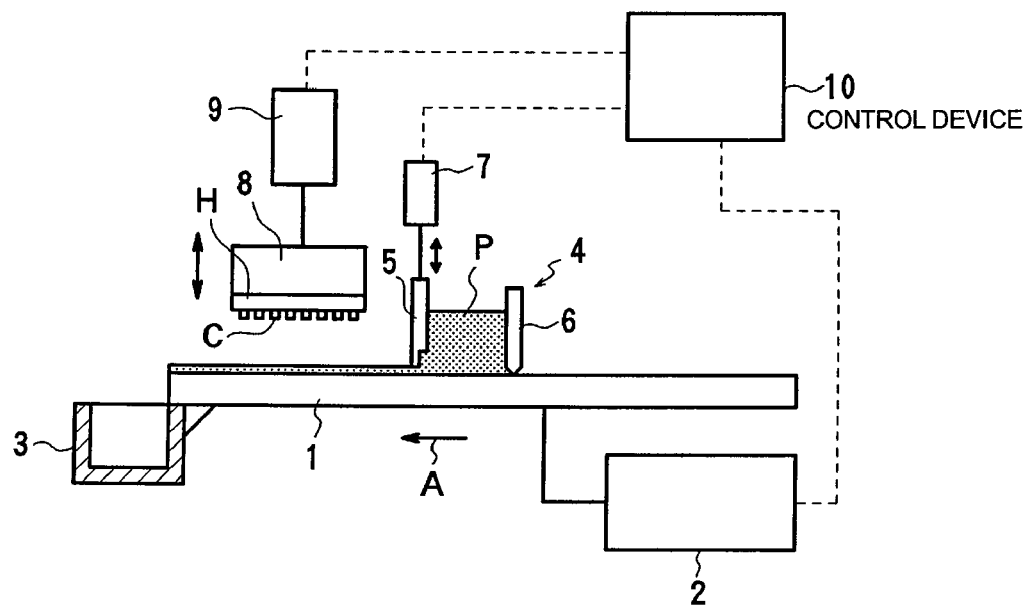
FIG. 3 is a side view of an apparatus for forming outer electrodes according to a first example.
Figure 4:
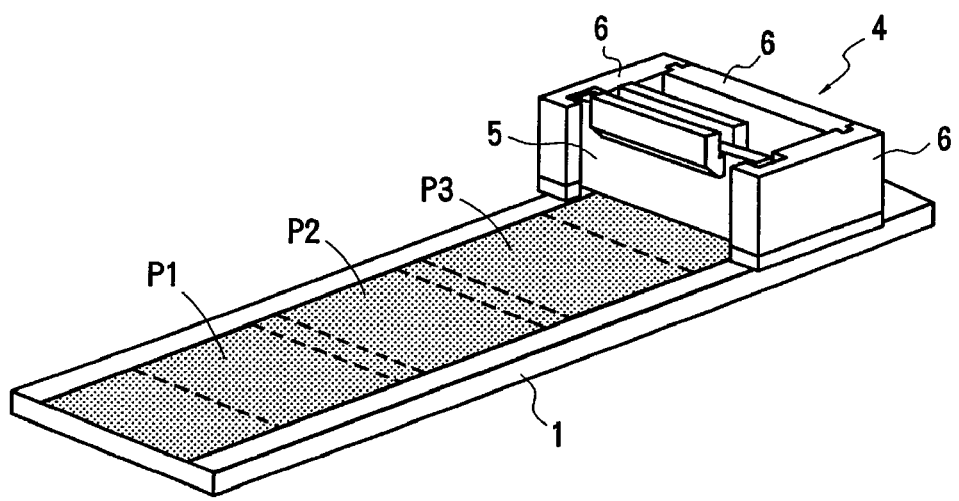
FIG. 4 is a perspective view of the apparatus for forming outer electrodes shown in FIG. 3.

FIGS. 3 and 4 illustrate an apparatus for forming outer electrodes of electronic components according to a first example.

In this apparatus, a holding plate H is used for holding a large number of chip-type electronic components C such that first end surfaces of the electronic components protrude outward. This holding plate H can be of the well-known type as described in, for example, Japanese Unexamined Patent Application Publication Nos. 58-90719 and 60-109204 having a large number of holding holes whose peripheral walls are composed of elastic rubber, each of the electronic components C being held by the corresponding hole. Alternatively, the holding plate H can be of the well-known type as described in Japanese Unexamined Patent Application Publication No. 5-74665 in which the electronic components are stuck to the surface of the holding plate H.

The apparatus for forming outer electrodes includes a flat board 1 having a flat top surface, and the flat board 1 has an area being a plurality of times as large as that of the holding plate H in the longitudinal direction of the flat board 1. The flat board 1 is driven horizontally in the longitudinal direction thereof by a driving device 2. A collecting box 3 for collecting paste remaining on the flat board 1 is fixed at an end of the flat board 1 adjacent to a starting end.

A box-shaped paste tank 4 storing electrode paste P is disposed at a certain position on the flat board 1. This paste tank 4 includes a side wall having a squeegee blade 5 vertically slidable so as to adjust a gap from the flat board 1 and the other side wall 6 whose lower end portion is in close contact with the flat board 1. The squeegee blade 5 is disposed on a side of the paste tank 4, the side corresponding to a rear side of the paste tank 4 during spreading of the paste, and the vertical position thereof is adjusted by a blade-adjusting device 7. The squeegee blade 5 has a leveling function of forming the electrode paste P into a predetermined thickness on the flat board 1 and a collecting function of scraping the paste remaining on the flat board 1 off.

A lifting head 8 for raising or lowering the holding plate H is disposed adjacent to the rear side of the paste tank 4, and the holding plate H is attached to the horizontal bottom surface of the lifting head 8. The lifting head 8 is raised or lowered by a head-lifting device 9. The first end surfaces of the electronic components C held by the bottom surface of the holding plate H so as to protrude outward are dipped in a paste film spread on the flat board 1 by lowering the lifting head 8.

The driving device 2 for driving the flat board, the blade-adjusting device 7, and the head-lifting device 9 are connected to a control device 10 using signal lines, and these devices 2, 7, and 9 are controlled by the control device 10 according to predetermined programs.

Next, operations of the apparatus for forming outer electrodes having the above-described structure will be described with reference to FIGS. 5(a) to 5(i).

Figure 5:
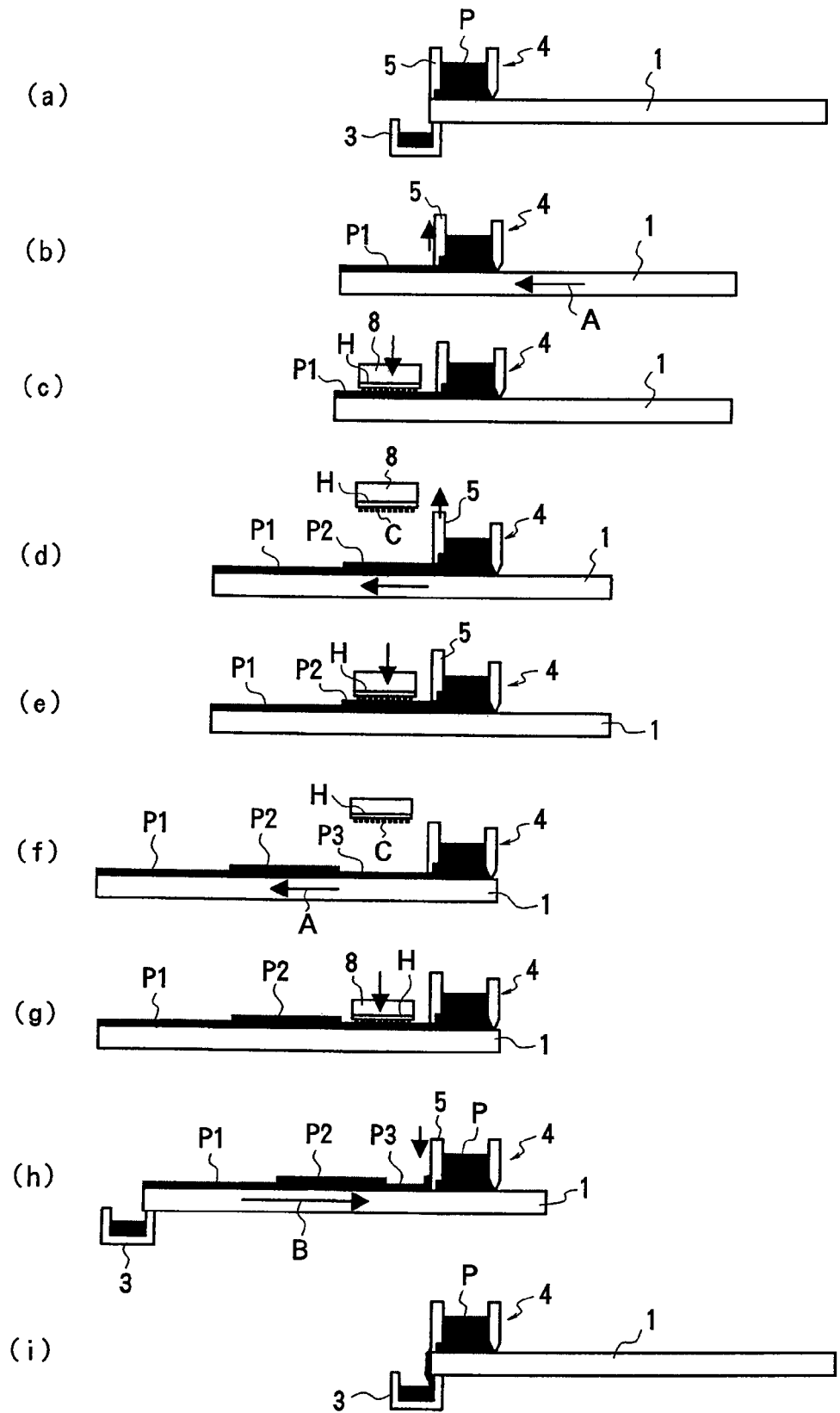
FIGS. 5(a) to 5(i) are views illustrating an example of processes of a method for forming outer electrodes according to the present invention.

FIG. 5(a) illustrates an initial state in which the paste tank 4 is located at the end of the flat board 1 adjacent to the starting end. In this state, the squeegee blade 5 is in contact with the flat board 1, and the paste P inside the paste tank 4 does not flow out.

FIG. 5(b) illustrates a state in which a predetermined gap is formed between the squeegee blade 5 and the flat board 1, and a paste film P1 is spread on the flat board 1 by moving the flat board 1 in the direction of an arrow A by a length corresponding to that of one holding plate.

FIG. 5(c) illustrates a first electrode application in which the holding plate H is lowered from above the paste film P1 spread on the flat board 1 such that the first end surfaces of the electronic components C protruding from the bottom surface of the holding plate H are dipped in the paste film P1.

FIG. 5(d) illustrates a state in which the holding plate H is raised while a next paste film P2 is spread on the flat board 1 by moving the flat board 1 in the direction of the arrow A by a length corresponding to that of one holding plate. Herein, the squeegee blade 5 is raised by operating the blade-adjusting device 7 before the second paste film P2 is formed in order to increase the thickness of the second paste film P2 compared with that of the first paste film P1. However, the thickness of the second paste film P2 may be the same as that of the first paste film P1.

FIG. 5(e) illustrates a second electrode application in which the first end surfaces of the electronic components C protruding from the bottom surface of the holding plate H are dipped into the paste film P2 spread on the flat board 1.

FIG. 5(f) illustrates a state in which the holding plate H is raised while a next paste film P3 is spread on the flat board 1 by moving the flat board 1 in the direction of the arrow A by a length corresponding to that of one holding plate. Herein, the thickness of the third paste film P3 is substantially the same as that of the first paste film P1. However, the thickness of the third paste film P3 may be substantially the same as that of the second paste film P1, or may be different from those of the first and second paste films.

FIG. 5(g) illustrates a third electrode application in which the first end surfaces of the electronic components C protruding from the bottom surface of the holding plate H are dipped in the paste film P3 spread on the flat board 1.

FIG. 5(h) illustrates a state in which the flat board 1 starts moving in an opposite direction B to the direction of the arrow A while the holding plate H is raised and while the squeegee blade 5 is in contact with the flat board 1. The paste films P1 to P3 remaining on the flat board 1 are scrapped off by the squeegee blade 5.

FIG. 5(i) illustrates a state in which all the paste spread on the flat board 1 is scraped off and collected in the collecting box 3 by moving the flat board 1 to the starting end.

The collected paste is reused after the solvent components are adjusted.

In FIGS. 5(a) to 5(i), the flat board 1 has a size corresponding to that of three holding plates. However, the size may be that of two holding plates or that of four or more holding plates.

Moreover, the squeegee blade 5 is separated from the flat board 1 after spreading the paste films and during the electrode application to the electronic components. However, every time the paste films are spread, the squeegee blade 5 may be brought into contact with the flat board 1. In this case, the outflow of the electrode paste P from the paste tank 4 can be prevented even when the viscosity of the electrode paste P is low.

Example 2

Figure 6:
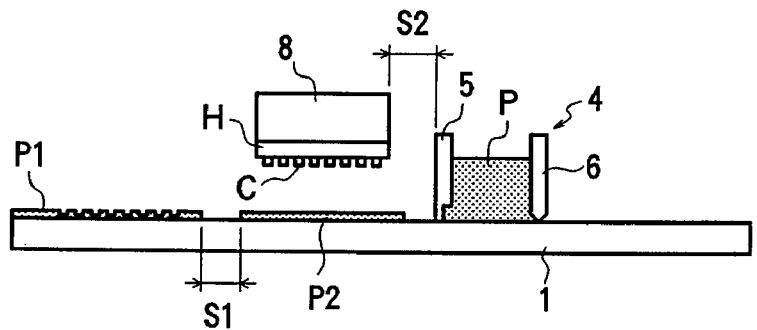
FIG. 6 is a side view of an apparatus for forming outer electrodes according to a second example.

FIG. 6 illustrates another example of operations of the above-described apparatus for forming outer electrodes.

In this example, the squeegee blade 5 is brought into contact with the flat board 1 after a paste film having a predetermined thickness and having a size corresponding to that of one holding plate is spread on the flat board 1, and in this arrangement, the paste tank 4 is moved with respect to the flat board along the flat board 1 in the same direction as a direction of spreading the electrode paste by a predetermined length. With this, an area S1 having no paste film is formed between an anterior paste film P1 and a posterior paste film P2.

The paste tank 4 and the lifting head 8 are disposed close to each other, and a space S2 is required for preventing interference between the paste tank 4 (or the squeegee blade 5) and the lifting head 8 (or the holding plate H). When no areas S1 having no paste film exist between the paste films as in Example 1 (see FIG. 4), unnecessary paste films each corresponding to the space S2 are formed at both sides of the paste films required for the electrode application. These unnecessary paste films are added by the number of applications, and thus the consumption of the paste is increased. In contrast, when the areas S1 having no paste film exist between the paste films as shown in FIG. 6, the areas of the unnecessary paste films can be reduced while ensuring the space S2 between the paste tank 4 and the lifting head 8, and the consumption of the paste can be reduced.

Example 3

Figure 7:
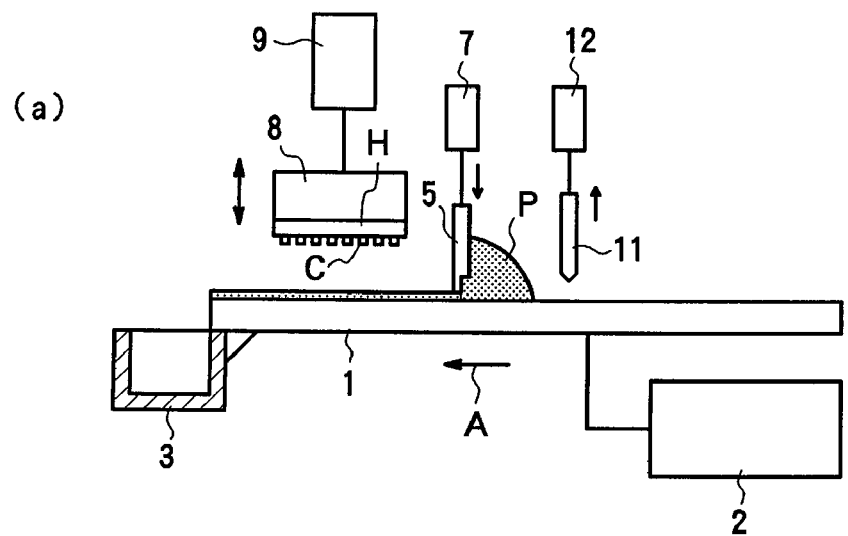
FIGS. 7(a) and 7(b) are side views of an apparatus for forming outer electrodes according to a third example.
Figure 7:
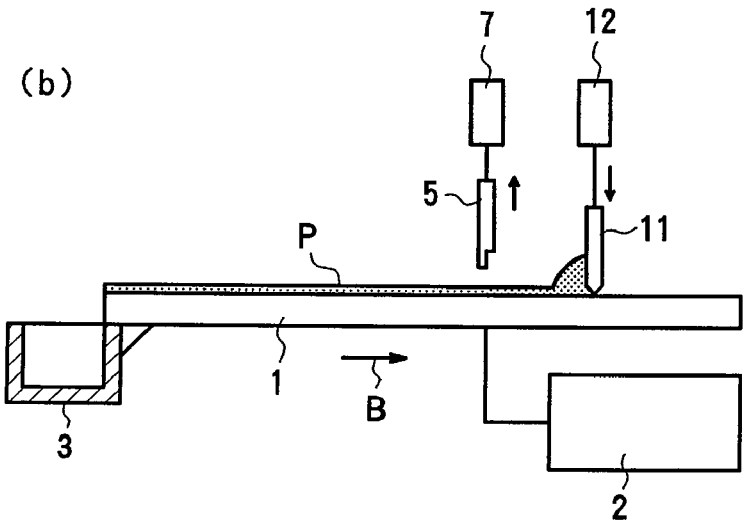

FIGS. 7(a) and 7(b) illustrate an apparatus for forming outer electrodes according to a third example.

In this example, a collecting blade 11 is disposed upstream of the traveling direction of the squeegee blade 5 with respect to the flat board 1 at a position remote from the squeegee blade 5 by a distance in the longitudinal direction of the flat board 1. The collecting blade 11 is driven by a driving device 12 so as to move to a contact position where the collecting blade 11 is in contact with the flat board 1 and to a remote position where the collecting blade 11 is remote from the flat board 1. The blade-adjusting device 7 for driving the squeegee blade 5 and the driving device 12 for driving the collecting blade 11 are retained at predetermined positions in an integrated manner.

As shown in FIG. 7(a), a paste film P is spread on the flat board 1 using the squeegee blade 5 by moving the flat board 1 in the direction of the arrow A, and the holding plate H held by the lifting head 8 is lowered and raised such that the electrode paste P is applied to the end surfaces of the electronic components C a plurality of times. Subsequently, as shown in FIG. 7(b), the collecting blade 11 is brought into contact with the flat board 1 while the squeegee blade 5 is separated from the flat board 1, and the flat board 1 is moved in direction B opposite to the spreading direction A such that the paste remaining on the flat board 1 is scraped off and collected in the collecting box 3. The paste scraped toward the starting end of the flat board 1 is not necessarily collected in the collecting box 3, and may be used for spreading and applying again.

In this example, the squeegee blade 5 is only used for leveling, and the collecting blade 11 is only used for collecting. Thus, these blades 5 and 11 can be composed of materials optimal for the corresponding functions.

Figure 1:
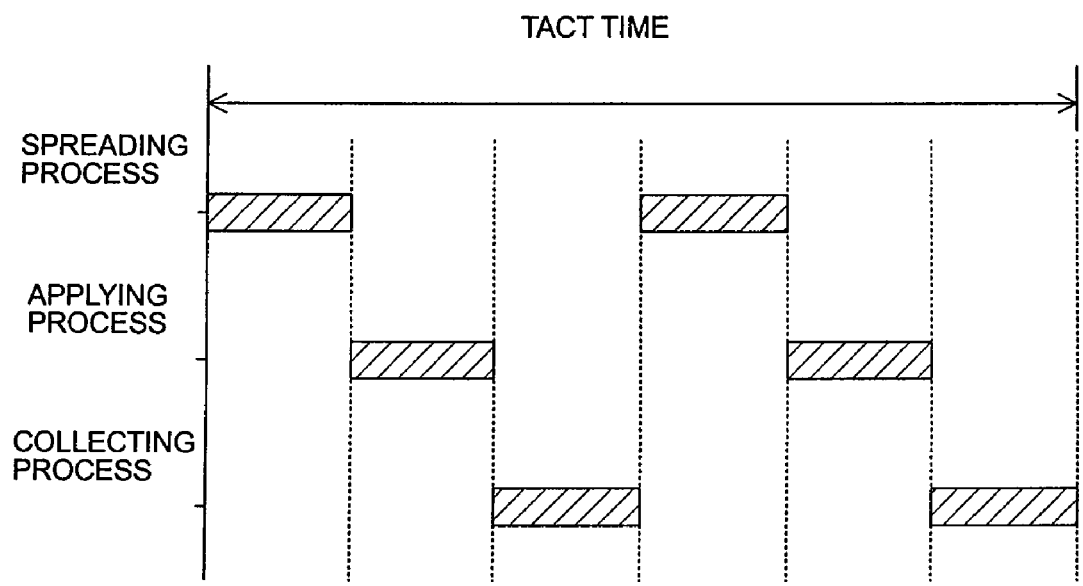
FIG. 1 is a time chart illustrating known steps of forming outer electrodes.
Figure 2:
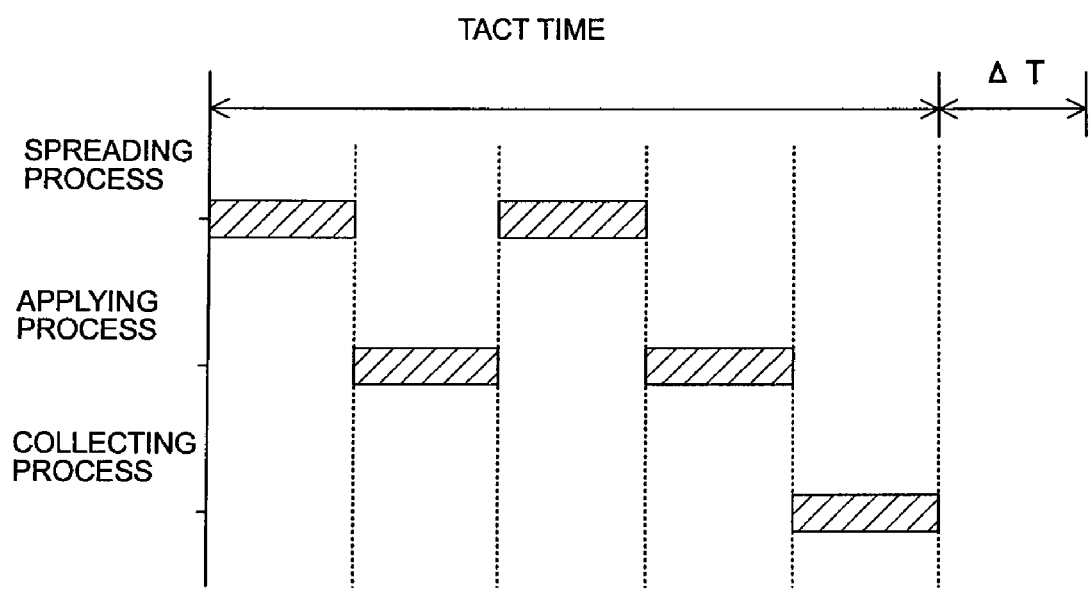
FIG. 2 is a time chart illustrating an example of steps of forming outer electrodes.

In FIG. 2, the spreading process, the applying process, and the collecting process are performed without being overlapped with each other in terms of time. However, the tact time can be further reduced by partly overlapping these processes in terms of time. For example, the applying process includes three operations of lowering the holding plate, dipping the electronic components, and raising the holding plate, and the applying process and the spreading process can be partly overlapped with each other in terms of time by moving the flat board 1 immediately after the holding plate starts rising and the electronic components are separated from the paste film. Similarly, the applying process and the collecting process can be partly overlapped with each other in terms of time.

In Example 1, the flat board 1 is horizontally moved while the paste tank 4 is retained at a certain position. However, the paste tank 4 may be horizontally moved along the flat board 1 while the flat board 1 is retained at a certain position. Similarly, in Example 3, the flat board 1 is horizontally moved while the squeegee blade 5 and the collecting blade 11 are retained at certain positions. However, the squeegee blade 5 and the collecting blade 11 may be horizontally moved along the flat board 1 while the flat board 1 is retained at a certain position.

Although particular embodiments have been described, many other variations and modifications and other uses will become apparent to those skilled in the art. Therefore, the present invention is not limited by the specific disclosure herein.

The invention claimed is:

1. An apparatus for forming an outer electrode of each of electronic components in which electrode paste is applied to first end surfaces of a large number of electronic components held by a holding plate such that the first end surfaces protrude outward, comprising:
    a flat board having an area being a plurality of times as large as that of the holding plate in a longitudinal direction of the flat board;
    a squeegee blade vertically slidable so as to adjust a gap from the flat board;
    a spreader arranged to spread a paste film having a predetermined thickness on a portion of the flat board by moving relatively the flat board with respect to the squeegee blade and the holding plate in the longitudinal direction of the flat board by a length corresponding to the length of substantially one holding plate while a predetermined gap is maintained between the squeegee blade and the flat board;
    an applicator arranged to apply the electrode paste to the first end surfaces of the electronic components held by the holding plate by dipping the first end surfaces of the electronic components in the paste film having a size substantially equal to that of one holding plate spread on the flat board; and
    a controller arranged and programmed to control the spreader and the applicator in spreading operations and dipping operations, in which every time the paste film having a size substantially equal to that of one holding plate is spread, the first end surfaces of the electronic components held by the holding plate are dipped in the paste film, and the spreading operations and dipping operations are repeated after the flat board is moved to a portion thereof that is different from the portion of the flat board on which the paste film has been applied until the electrode paste is applied to the first end surfaces of the electronic components a plurality of times.

2. The apparatus for forming an outer electrode of each of electronic components according to claim 1, wherein the controller is arranged and programmed to move relatively the squeegee blade with respect to the flat board along the flat board by a predetermined length in the same direction as a direction of spreading the electrode paste while the squeegee blade is in contact with the flat board after the paste film having a predetermined thickness is spread on the flat board and by the next time the paste film is spread.

3. The apparatus for forming an outer electrode of each of electronic components according to claim 2, wherein the spreader is arranged to move the flat board in the longitudinal direction of the flat board while retaining the squeegee blade at a certain position.

4. The apparatus for forming an outer electrode of each of electronic components according to claim 1, wherein the controller is arranged and programmed to control such that the paste film spread on the flat board is removed by moving relatively the squeegee blade with respect to the flat board in a direction opposite to the spreading direction while the squeegee blade is in contact with the flat board after the electrode paste is applied to the first end surfaces of the electronic components a plurality of times.

5. The apparatus for forming an outer electrode of each of electronic components according to claim 4, further comprising:
    a paste tank including a side wall having the squeegee blade and another side wall whose bottom end portion is in close contact with the flat board, and storing the electrode paste inside the paste tank, wherein
    the paste tank is relatively movable with respect to the flat board in the longitudinal direction of the flat board.

6. The apparatus for forming an outer electrode of each of electronic components according to claim 1, further comprising:
    a collecting blade located at a position remote from the squeegee blade by a distance in the longitudinal direction of the flat board and vertically slidable between a contact position where the collecting blade is in contact with the flat board and a remote position where the collecting blade is remote from the flat board.

7. The apparatus for forming an outer electrode of each of electronic components according to claim 6, wherein the controller is arranged and programmed to control the apparatus such that only one collection process is conducted after a plurality of spreading and dipping operations.

8. The apparatus for forming an outer electrode of each of electronic components according to claim 1, wherein the spreader is arranged to move the flat board in the longitudinal direction of the flat board while retaining the squeegee blade at a certain position.

9. The apparatus for forming an outer electrode of each of electronic components according to claim 1, further comprising:
    a paste tank including a side wall having the squeegee blade and another side wall whose bottom end portion is in close contact with the flat board, and storing the electrode paste inside the paste tank, wherein
    the paste tank is relatively movable with respect to the flat board in the longitudinal direction of the flat board.

10. The apparatus for forming an outer electrode of each of electronic components according to claim 1, wherein the controller is arranged and programmed to control the apparatus such that only one collection process is conducted after a plurality of spreading and dipping operations.

* * * * *